UNITED STATES PATENT OFFICE.

GEORGE E. FERGUSON, OF NEW YORK, N. Y., ASSIGNOR TO PYRENE MANUFACTURING COMPANY, A CORPORATION OF DELAWARE.

FIRE-EXTINGUISHING COMPOSITION HAVING LOW FREEZING-POINT.

1,270,392.     Specification of Letters Patent.     Patented June 25, 1918.

No Drawing.     Application filed August 12, 1914. Serial No. 856,349.

*To all whom it may concern:*

Be it known that I, GEORGE E. FERGUSON, a citizen of the United States, and resident of the city, county, and State of New York, have invented certain new and useful Improvements in Fire-Extinguishing Compositions Having Low Freezing-Point, of which the following is a specification.

This invention relates to liquid compositions having a low freezing point and more particularly to fire extinguishing compositions.

The object of the invention is to provide a composition in which the freezing point is materially lowered to a point below that to which the composition would ordinarily be subject. A further object of the invention is to provide a composition which, in addition to the above feature, shall be adapted for use as a fire extinguishing composition and in which its efficiency for this purpose is preserved and may be increased by the addition of the elements hereinafter set forth for the purpose above specified.

A further object of the invention is to provide a composition such as described in which the boiling point and the specific gravity is not changed from that of the basic element or elements therein contained or introduced for the purpose of adapting the composition for its particular use.

In compositions intended for use as a fire extinguisher carbon tetrachlorid is ordinarily used as the basic element. The freezing point of commercial carbon tetrachlorid varies from approximately −19° C. to −25° C., depending upon the degree of purity of the same. It has been found by experiment that commercial carbon tetrachlorid contains more or less carbon disulfid and it was found that the carbon tetrachlorid containing the least carbon disulfid had the higher freezing point.

In fire extinguishing compositions it is desirable to have a freezing point as low as −50° C. and it has been found by a long series of experiments and investigation that certain compounds classified as liquid aliphatic polychlorinated hydrocarbons having one atom of carbon to the molecule and also compounds of the class known as aliphatic polychlorinated hydrocarbons having two or more atoms of carbon to the molecule may be used to advantage to produce the desired results.

The following experiments are illustrative of the results obtained:—

Using dichlorethylene ($C_2H_2Cl_2$) in the proportion of 13.5 parts dichlorethylene and 50 parts carbon tetrachlorid, by volume, the freezing point of the carbon tetrachlorid was lowered from −20° C. to −50° C.

Using 10.5 parts of trichlorethylene ($C_2HCl_3$) to 50 parts carbon tetrachlorid (by volume) lowered the freezing point from −20° C. to −50° C. Using 9 parts of perchlorethylene ($C_2Cl_4$) to 50 parts carbon tetrachlorid (by volume) lowered the freezing point from −20° C. to −50° C.

Using 10.5 parts of tetrachlorethane ($C_2H_2Cl_4$) to 50 parts of carbon tetrachlorid, by volume, the freezing point of the carbon tetrachlorid was lowered from −20° C. to −50° C.

Using 12 parts of pentachlorethane ($C_2HCl_5$) to 50 parts of carbon tetrachlorid, by volume, the freezing point of the carbon tetrachlorid was lowered from −20° C. to −50° C.

In some cases the chlorinated compounds which were added to the carbon tetrachlorid, were found to have a freezing point lower than the mixture of carbon tetrachlorid with the chlorinated body, which would give the impression that the result (the lowering of the freezing point of the carbon tetrachlorid) was accomplished by merely striking an average between the freezing point of the carbon tetrachlorid and the freezing point of the chlorinated body added. This, however, is not the case, because when the freezing point of the perchlorethylene ($C_2Cl_4$) was determined it was found to be −33° C. but the freezing point of the mixture of perchlorethylene and carbon tetrachlorid (given above) was lower than that of either the carbon tetrachlorid or the perchlorethylene. The same argument holds true in the case of the pentachlorethane, which freezes at −34° C. Another proof that the lowering of the freezing point of the carbon tetrachlorid by the addition of the before mentioned compounds can not be determined by merely the striking of an average, is the fact that no two curves, plotted in the freezing point determinations of equally varying proportions, relatively to the carbon tetrachlorid, of the different polychlorinated hydro-carbons, are alike in shape.

It is known that these compounds when mixed (they are all soluble—one in the other) do not react chemically. That is to say, that if a combination may be made of twenty-five parts, each, of all the compounds before mentioned, there will not be formed any new compounds, and the proportions of the mixture will remain the same. This is important because it may be desirable to lower the freezing point of carbon tetrachlorid, for example, and not substantially change the boiling point or the specific gravity of the resulting combination from that of carbon tetrachlorid. Suppose in this particular case we desire to have a mixture of carbon tetrachlorid which has substantially the same boiling point and specific gravity as the carbon tetrachlorid but must not freeze until it reaches a temperature of —50° C. A combination of this sort could be made by using 50 parts of carbon tetrachlorid, 12 parts of trichlormethane and 21 parts of pentachlorethane, by volume. These compounds are all ideal for fire extinguishing purposes in connection with carbon tetrachlorid. They all form dry, non-combustible, non-supporting of combustion, gas-blankets. They are all non-conductors of electricity and produce non-poisonous fumes when volatilized on a fire. As far as their useful properties are concerned, they are all grease solvents and, in general, can be employed for the same purposes to which carbon tetrachlorid is adapted.

Dichlorethylene, trichlorethylene, perchlorethylene, tetrachlorethane, and pentachlorethane may be classified as polychlorinated hydrocarbons having two atoms of carbon to the molecule while tri-chlormethane has one atom of carbon to the molecule, tri-chlormethane and pentachlorethane being termed broadly polychlorinated saturated hydrocarbons.

It is thus seen that an efficient fire extinguishing composition may be produced which has an extremely low freezing point, while the boiling point, specific gravity, and all the other properties are not changed from that of carbon tetrachlorid, which is the basic element. This is an important feature for if these properties were changed the efficiency of the composition for the purpose intended might be destroyed.

While the compositions which have been described are intended primarily for use in extinguishing fires, it will be obvious that the invention may be applied for use in connection with various other compositions for other purposes in which it is desired to produce a compound having a low freezing point without changing the boiling point or the specific gravity.

Having now described my invention, what I claim as new and desire to protect by Letters Patent is:—

1. A fire extinguishing composition composed of 50 parts of carbon tetrachlorid, 12 parts of trichlormethane, and 21 parts of pentachlorethane, by volume.

2. A fire extinguishing composition composed of carbon tetrachlorid, trichlormethane, and pentachlorethane.

Signed at the city, county, and State of New York, this 6th day of August, 1914.

GEORGE E. FERGUSON.

Witnesses:
LILLIAN E. GRIFFIN,
ELIZABETH S. MEAELE.